US007181878B2

(12) United States Patent
Tucker

(10) Patent No.: US 7,181,878 B2
(45) Date of Patent: Feb. 27, 2007

(54) LABEL, OR BUSINESS FORM/LABEL COMBINATION HAVING MULTIPLE LAYERED OR PATTERNED COATED ADHESIVES AND METHODS OF MAKING SAME

(75) Inventor: D. Mark Tucker, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 317 days.

(21) Appl. No.: 10/689,945

(22) Filed: Oct. 21, 2003

(65) Prior Publication Data

US 2005/0081415 A1 Apr. 21, 2005

(51) Int. Cl.
*B32B 33/00* (2006.01)

(52) U.S. Cl. ........................................ 40/638; 428/40.1

(58) Field of Classification Search ..................... None
See application file for complete search history.

(56) References Cited

U.S. PATENT DOCUMENTS 4,771,891 A * 9/1988 Sorensen et al. ........ 206/459.5
4,995,641 A * 2/1991 Landry et al. ................ 283/67
5,011,559 A * 4/1991 Felix .......................... 156/257
5,591,290 A * 1/1997 Walter et al. ............... 156/152
5,770,288 A * 6/1998 Carney, Jr. ................. 428/40.1
6,290,261 B1 * 9/2001 Waggoner et al. ............ 283/62

* cited by examiner

*Primary Examiner*—Cassandra Davis
(74) *Attorney, Agent, or Firm*—Michael C. Maier

(57) ABSTRACT

The present invention relates to a label or a business form label combination in which the labels have been created by applying multiple zones or coatings. The zones or coatings can have differing thicknesses, coat weight or may use a variety of adhesives. The label is intended for a variety of different industries such as business, marketing, advertising, retail, wholesale, industrial, personal, and the like and more particularly the label is suitable for use in contaminated or difficult to label applications.

12 Claims, 6 Drawing Sheets

LABEL, OR BUSINESS FORM/LABEL COMBINATION HAVING MULTIPLE LAYERED OR PATTERNED COATED ADHESIVES AND METHODS OF MAKING SAME

CROSS-REFERENCES TO RELATED APPLICATIONS

None.

FIELD OF THE INVENTION

The present invention relates to a label or business form label combination that may include a uniform perimeter of adhesive, multiple zones, layers, or patterns of adhesives one or more of which may differ in thickness or adhesive type. The patterns or layers may be printed, applied or provided on any desired substrate and may be disposed in a substantially adjacent configuration with one another, in a spaced or staggered arrangement or juxtaposed upon one another. More particularly the present invention relates to a unique adhesive product that is suitable for use with substrates or objects that are typically not generally receptive to adhering labels to the surface, due to the presence of contaminants or debris, such as oils, grease, dust, dirt, etc., that may arise directly from the manufacturing process or alternatively through the handling and storage of the article. In addition, the present invention may also be used in connection with rough or discontinuous surfaces or textures in addition to those having contaminants such as structural or composite corners, wood, burlap, furniture, steel, corrugation, manhole covers, cast iron, pig iron, foundry work, concrete, automobile and vehicle tires, logs, inner tubes, rubber pipes and hoses, automotive and vehicle components and the like.

BACKGROUND OF THE INVENTION

Labels and/or business form label combinations are generally well known in the business form and label industry. Labels and/or business forms containing one or more labels are typically formed by die cutting so as to enable the easy removal or peeling of the label from a release liner or carrier ply. The pressure sensitive adhesive is usually applied to the carrier ply or release liner and then transfers to the backside of the label on removal of the label from the ply or liner. That is, the adhesive has a greater pull for the face of the label than the carrier ply and the adhesive adheres to the label ply or face ply during separation or peeling. Phrased another way, the label or face sheet has a greater affinity for the adhesive than does the carrier or release ply and as such, the adhesive will adhere or bond more aggressively to the backside of the label or face stock, than to the carrier ply which has a release coating (silicone). An exemplary construction is found in U.S. Pat. No. 5,011,559 and is commonly used in the industry.

While such prior art labels lend themselves to a large number of uses and applications, the labeling of products which have a surface that may have contaminants (oils, grease, dirt, dust, debris, etc.) as well as discontinuous surfaces (pitted, peak & valleys, grooved, patterned, etc.) are often difficult to initially adhere a label to, as well as to retain the label in its position. It has been found that in labeling such a surface, the label will often separate or peel away from the surface due to the contaminants or discontinuous surface conditions. In addition, the contaminants will likely also be picked up by the label thereby reducing the adhesive strength by blocking or concealing the adhesive that holds the label to the surface making retaining the label in position difficult and reapplication virtually impossible. Moreover, where such labels are weakened by such contaminants or do not have sufficient adherence to the surface, the labels can be knocked off by contact, (inadvertent or otherwise) such as during handling or transport. When the foregoing occurs, the identification or product description provided by the label is lost requiring the retailer to possibly discount the goods due to the loss of the identification or alternatively, the retailer may require the manufacturer to re-label or take back the goods likely leading to unnecessary expense and lost time and effort.

Traditional prior art labels also have a tendency to degrade or lose their tackiness over time or they may fall off due to inclement weather, extreme temperature deviations, exposure to chemicals and cleaning components and the like. In the business forms and labels industry the issue of premature lifting or tackiness breakdown of a label typically occurs, in that over an extended period of time current prior art/constructions tend to "lift" or "curl up" on the edges, sometimes referred and/or deemed as "premature lift" and/or "edge lift". This premature lift is potentially due to the limited thickness of the applied adhesive which generally are less than about 1 mil. The thickness of the prior art labels or coating height as such is typically limited by manufacturing and coating technologies available in the market today.

A further attempt to rectify the foregoing situation of labels detaching from the surface, manufacturers and retailers have sought to physically affix labels and tags directly to such substrates such as through the use of mechanical fasteners like staples, rivets, screws, etc. However, mechanical fasteners, once removed, typically leave holes or other marks in the product from which they are removed creating an aesthetically displeasing product presentation.

Other attempts have lead to bonding or welding tags or plates to the "hard to label" surface. In addition to being expensive and potentially slowing down the distribution of the products by having to apply such welds or bonds, the welds or bonds may also distort or leave deformities in the surface of the article which again takes away from the overall value and presentation of the product.

A still further prior art solution was to increase the amount of thickness of the single adhesive on the substrate. However, as labels are typically provided in a continuous format (fan folded, roll, etc.) the pressure from the stack would cause adhesive to leak out or ooze causing the labels to adhere to one another in the stack making separation of individual labels from the stack difficult or messy.

What is needed therefore is an easy to use label structure that overcomes the foregoing drawbacks and which can lend itself to difficult or extreme labeling applications.

BRIEF SUMMARY OF THE INVENTION

The embodiments of the present invention described below are not intended to be exhaustive or to limit the invention to the precise label and/or forms with a label(s) disclosed in the following detailed description. Rather, the embodiments are chosen and described, so that others skilled in the art may appreciate and understand the principles and practices of the present invention.

The present invention includes one or more labels that can be provided in either a single label format, or in a multiple label embodiment in which the label or labels have been placed onto a release coated surface, such as a carrier ply of a business form. Each label typically will include a backer ply of liner material, also known as a carrier ply or carrier web, that contains a release coating (silicone) on one side, as well as, an adhesive coating that is applied to the release coated side of the carrier ply and/or can be on the face of the label or form as well. The adhesive is applied to a face ply and upon removal of the face ply the adhesive remains adhered to the face ply. Likewise, where the liner carrier ply is removed the adhesive will cling to the face ply.

The label or business form/label combination described in this exemplary embodiment of the present invention may also include an adhesive free edge, or area of the label or face ply that generally extends around the perimeter that is not covered by adhesive. A further embodiment includes the use of multiple coating applications and/or processes, such as, screen coating, zone coating, slot die coating, multiple layered coating, and the like. The present invention overcomes the drawbacks of the prior art through the use of adjacent layered, abutted layered, multiple layered (such as stair stepped configurations), segmented coatings, patterned coatings, or juxtaposed coatings of adhesive as well as variability of coat weights, peel strengths, and types of adhesive. Through the use of multiple or adjacent layers, patterns, coat weight and the like, the invention may be used in connection with roughened textured surfaces such as, logs, rubber hoses, manhole covers, tires and those alluded to earlier.

Surprisingly, it has been found that the invention has greater durability and a longer life span due to the characteristics of having multiple layers, staggered or stair stepped adhesives, juxtaposed adhesives, or patterned coated adhesives than prior art constructions. To eliminate oozing in printers the novel label of the present invention overcomes the drawback of the prior art constructions by the inclusion of significantly greater thickness adhesive coatings. Such coatings may be two to up to ten times the adhesive thickness of prior art constructions.

In other embodiments of the present invention the construction may contain multiple labels that can be used and implemented in a variety of ways to accomplish any number of operations or applications that the end-user may have. The present invention finds application in a variety of industries, including retail, wholesale, marketing, and advertising. One particular advantageous use of the present invention is with respect to vehicle tires (automobile, truck, tractor, ATV's, motorcycles, etc.) manhole covers and foundry work which can provide difficult labeling surfaces.

The labels of the present invention may be placed at predetermined intervals on the carrier ply. That is, they can be placed in a segregated or spaced arrangement. The carrier ply is secured to the backside of the label and/or business form label combination by means of removable adhesive, permanent adhesive, repositionable adhesive, and combinations thereof.

In one embodiment of the present invention, a business form label combination is described and includes a substrate that has first and second faces, with each of the first and second faces having a central portion and a perimeter portion. One of the first and second faces has a first area for receiving indicia and the other of the faces has a second area capable of receiving a label or adhesive. The second area, of this presently described embodiment has a central portion and a perimeter portion. A first pattern of adhesive is applied to the second area along with a second pattern of adhesive. The second pattern of adhesive is disposed in a manner so that it is substantially adjacent the first pattern of adhesive. The second area also has an adhesive free area extending about the perimeter portion. The term "adjacent" as used herein may include side-by-side or top and bottom.

In a further embodiment of the present invention a label is described and includes a substrate that has first and second surfaces and at least first and second adhesive patterns of adhesives that are applied to one of the first and second surfaces in a stair step configuration. The first and second adhesive patterns are applied in a manner so as to be substantially adjacent to one another, such as in a side-by-side configuration.

The labels of the above-referenced embodiments are suitable for use in contaminated environments, discontinuous surfaces and combinations thereof including, structural or composite corners, wood, burlap, furniture, steel, corrugated materials, manhole covers, cast iron, pig iron, foundry work, concrete, automobile and vehicle tires, logs, inner tubes, rubber pipes and hoses, automotive, vehicle components and combinations thereof.

In addition, the labels of the foregoing embodiment can utilize adhesives that are different, distinct, or have different properties from one another such as permanent adhesives, removable adhesives, repositionable adhesives and the like or combinations thereof.

In yet a still further embodiment of the present invention a label is described and includes a sheet that has first and second surfaces, with at least one of the first and second surfaces having a plurality of adhesive patterns applied thereto. The plurality of adhesive patterns are applied in such a manner so as to be substantially juxtaposed on one another.

In an additional exemplary embodiment, a label is described and includes a substrate that has first and second surfaces and at least first and second adhesive patterns of adhesives applied to one of the first and second surfaces in a stair step configuration. The stair step configuration is achieved by applying the first and second adhesive patterns in a manner so that the adhesives are substantially adjacent one another.

The exemplary embodiments described above also include the use of one or more adhesives having first and second properties that are distinct from one another. Illustrative properties may include thickness, coat weights, adhesive types and the like.

In an illustrative use of the present invention for a discontinuous surface relates to a combination of a tire and label. A label is applied to the surface of the tire and includes first and second surfaces with at least one of the first and second coatings of adhesive applied to at least one of the first and second surfaces of the label. The first coating of adhesive has a different tack level than the second coating of adhesive.

In a yet still further exemplary embodiment of the present invention a label is described and includes a substrate that has first and second faces, each of the first and second faces having a central portion and a perimeter portion. One of the first and second faces has a first area for receiving indicia and the other of the faces has a second area capable of being coated with adhesives. The second area has a central portion and a perimeter portion. The first pattern of adhesive is applied to one of the first and second faces in the second area. In this exemplary embodiment the second pattern of adhesive is applied to the face that the first pattern has been applied, with the second pattern of adhesive being disposed in a manner so as to be substantially adjacent the first pattern of adhesive. The label structure of this embodiment is also provided with a second area that has an adhesive free area which extends about the perimeter portion.

The label structure may be used with discontinuous surfaces having a substrate with a first pattern of adhesive having a first thickness and a second pattern of adhesive having a second thickness wherein the second pattern of adhesive may be disposed on first pattern of adhesive. The first and second patterns of adhesive have a combined thickness greater than that of a single pattern.

The label structure may be used in cast iron, pig iron, foundry work applications and the like, with the label structure having a surface. The label applied to the surface having first and second surfaces, and at least two coatings of adhesive are applied to at least one of the first and second surfaces, such that the coatings of adhesive has a thickness greater than that of a single coating.

BRIEF DESCRIPTION OF THE DRAWINGS

These, as well as, other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description, but it should be understood that the present invention is not to be construed as being limited thereto.

The present invention with its unique characteristics can be used in a variety of harsh environments and applied to discontinuous textured surfaces, such as tires, rubber hoses, floor mats, wood, concrete, manhole covers, corrugated pieces, automotive batteries, metal, burlap, furniture, steel, discontinuous and roughened surfaces and other high/low surface energy materials.

Unexpectedly, the multiple layers, thicknesses, or patterned coat weights of adhesive of the present invention allows the label product to withstand dirty, dusty, oily, contaminated environments, and the like, and be adhered to discontinuous and uneven surfaces, due to the use of plural adhesives either in type or variety or in application of coat weights or thicknesses. In addition the present invention substantially eliminates printer contamination/adhesive ooze. Without wishing to be bound to any particular theory, it is believed that by coating adhesives with differential thicknesses, so as to create a label with a greater adhesive base, that the adhesive or adhesive patterns can "flow" into any cavities, grooves, depressions, or the like of a discontinuous surface or capture contaminants, so that sufficient adhesive remaining exposed adheres the label to the surface to which it is applied.

Figure 1:
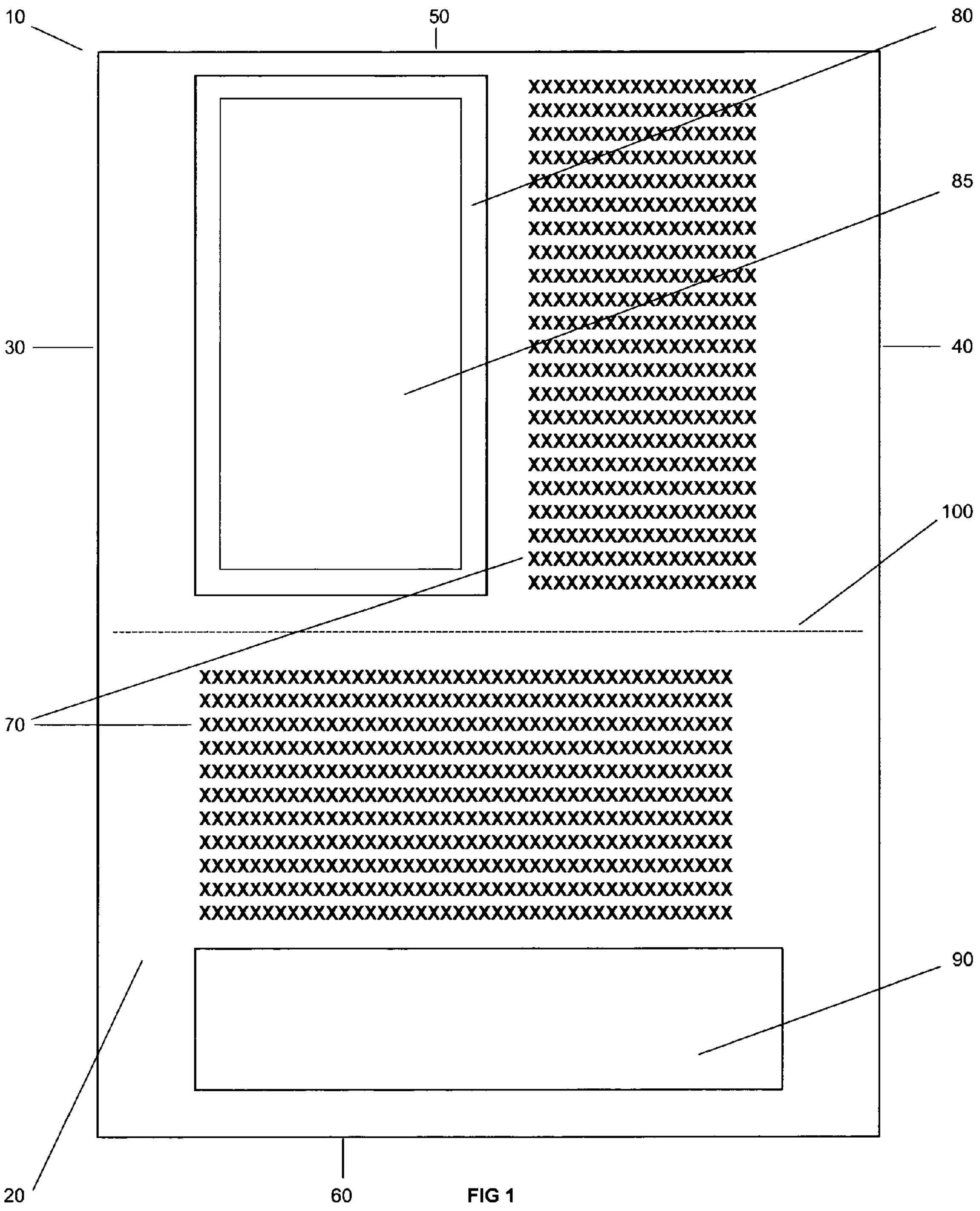
FIG. 1 depicts a front view of a business form and label containing multiple coatings.

Turning now to FIG. 1, an exemplary embodiment of the product produced in accordance with the present invention is depicted and referred generally by reference to numeral 10. The substrate 10 has a first face 20 and a second face, which is on the reverse side of the substrate, which is not depicted. The substrate has first and second longitudinally extending side edges 30 and 40, respectively and first and second transversely extending end edges 50 and 60, respectively. The substrate 10 is shown with one or more printable areas, 70, that receives pre-print and/or post print from the end-users resources and the like. It should be understood that the form/label may be blank when delivered to the end user.

The substrate may be selected from any suitable material such as cellulosic-based stock (paper, tag stock, card stock, etc.) or may include all plastic or all synthetic films (polyester, polyethylene, polystyrene based materials) or metalized films.

The face 20 of the substrate is one that is suitable for receiving printing, imaging, or other rendering of graphics indicia. In addition, the face 20 may be provided with toner or ink receptive coatings in order to better hold out the ink (prevent to much ink from soaking into the paper) or anchor the toner to the paper (to prevent the toner from dusting off) such as a polyvinyl alcohol (PVA). The face 20 of the substrate 10 may also be coated, either entirely or in predetermined locations such as spot applications where particular printing information is to appear.

To further illustrate the printing or imaging that may be used in connection with the present invention, such as may occur with the end-user purchasing labels or business form label combinations from a manufacturer of forms and labels, the printable area(s), 70, may contain the end-users' desired pre-print, such as name, contact details, general product descriptions, etc. that are typically applied by the forms/labels manufacturer. In addition, the present invention also lends itself to additional printing or imaging by the end-user. Such post manufacture printing may include pricing information, retail outlet name, specific warranty and other product information and the like. Such printing can be accomplished through non-impact printers, (ink jet, laser printers, thermal printers) as well as impact printers.

In one embodiment of the present invention, the coating of adhesive is applied in first and second patterns, 80 and 85, respectively. In an exemplary manufacturing process a first web having a first adhesive pattern and a first thickness is brought into contact with a second web having a second adhesive or pattern and a second thickness. The first web is stripped off as the adhesive on the second web pulls the first pattern of adhesive away. That is, the adhesive from the first web is married with the adhesive of the second web, thus achieving the coating thickness or pattern of the present invention.

Another process suitable for producing the present invention is through the use of slot dies through which the different patterns of adhesive are extruded onto a web. The term pattern, as used herein, refers to coating an entire surface area of a substrate, as well as applying discrete spot segments or the like to a surface area of a substrate. Such patterns may be applied through the use of screens, blades, rods, extruders, or other means known in the industry. Patterns may be continuous, discontinuous, regular, or irregular.

The coatings/adhesives for this application can be procured from such vendors as HB Fuller located in St. Paul, Minn. & National Starch Co., located in Bridgewater, N.J.

The business form of the present invention may also include an additional coating of adhesive 90 and may be applied to the form and used to provide conventional labels. These auxiliary labels may be placed on top of the layered label of the present invention so as to create a piggyback arrangement.

Also as seen in FIG. 1, multiple layered and/or different types or properties of adhesives can be applied to a single substrate. Such an arrangement allows the end-user the ability to use the label configuration for a variety of projects and or tasks. As an example, the coating of the entirety of the areas designated by 80 and 85 can be applied to one surface or product and the labels created by coating area 90 could be applied to a distinct or separate product. That is, the plural label structures of the present invention enable multiple uses to be made of the product so that the end user can meet all of its needs with respect to its particular labeling application.

The invention further contemplates other features that may be supplemental or ancillary to the main features of the invention, these include but are not limited to perforations or cuts 100, so that the substrate 10 may be separated in to first and second parts, etc., as shown by the label or labels in the predetermined coating areas, depicted as 80, 85, and 90.

Figure 2:
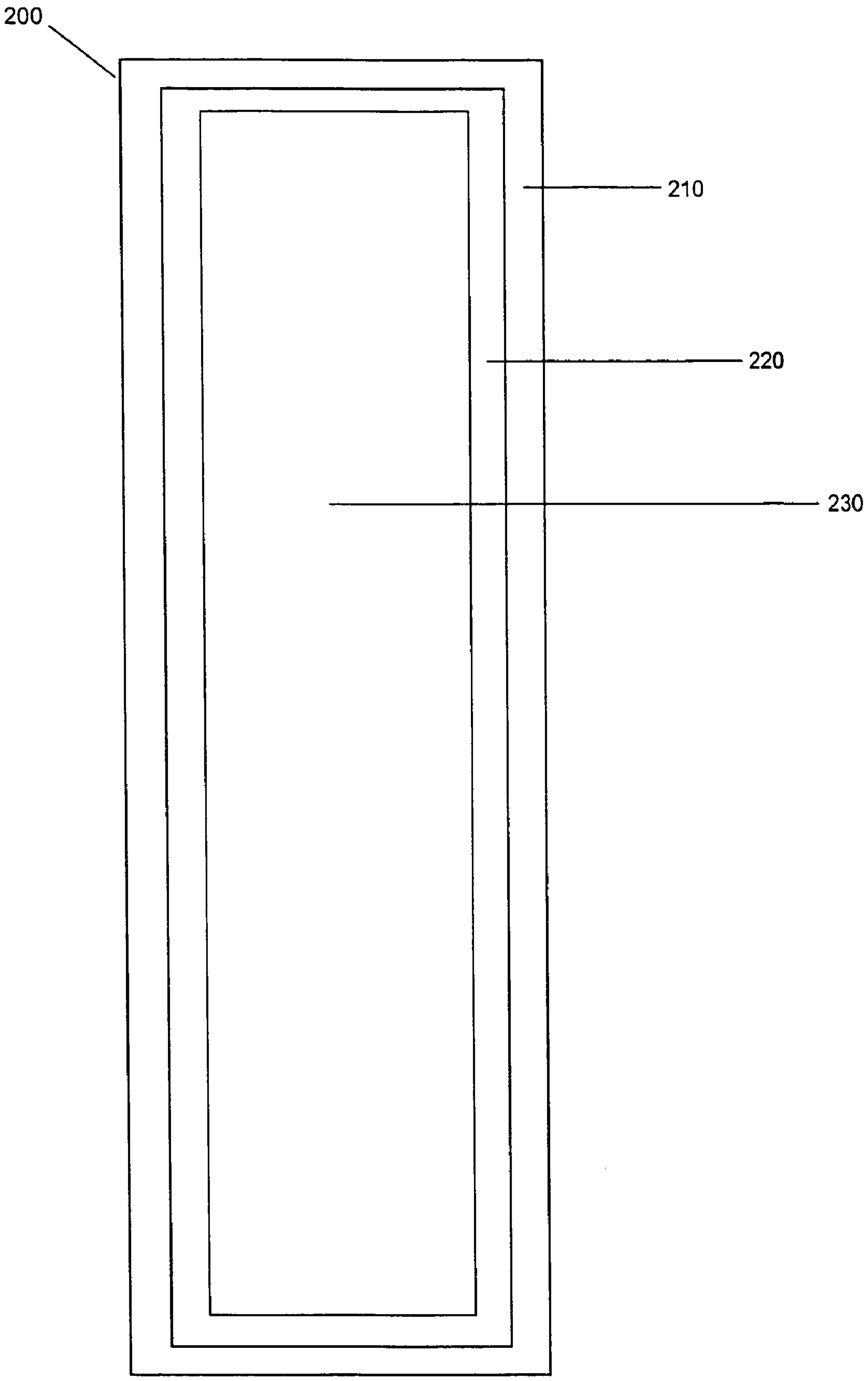
FIG. 2 shows the back side of a label having multiple thicknesses of adhesive applied to the substrate

Turning now to FIG. 2, the substrate is depicted generally as 200. The reference numeral 210 depicts an adhesive free edge of the substrate 200 which generally extends around a perimeter of the substrate. It should be understood that the coated free edge 210 may also only appear along the transverse end edges or alternatively only along the longitudinally extending side edges. A still further arrangement would be to have one free transverse end edge and one free longitudinal side. Other permutations and combinations are of course possible.

Reference numeral 220 depicts a first coating, pattern, type or layer of adhesive and has a coat weight or thickness ranging from about 0.001 mil to about 8.0 mil or more of adhesive, with a more preferred exemplary embodiment ranging from about 0.001 mil to about 3.0 mil.

Reference numeral 230 depicts a second coating, pattern, type or layer of adhesive ranging from about 0.001 mil to about 5.0 mil coat weight or thickness of adhesive, with a more preferred exemplary embodiment ranging from about 0.001 mil to about 3.0 mil. The second coating 230 can be applied or juxtaposed directly onto the first pattern or layer of adhesive 220. Alternatively, the first pattern or layer of adhesive 220 can be applied or coated in a first area and the second pattern or layer of adhesive 230 applied or coated in a second area so that the first and second adhesives are disposed in a substantially adjacent configuration (refer to FIGS. 3B & 3C). That is, a stair-stepped configuration is created. In addition, the two adhesives can be coated in such a manner that a small air space exists in the stair stepped or side by side arrangement, at least initially, between the two patterns of adhesive so that the two adhesives do not blend, bleed or otherwise contact one another. The air space may dissipate when pressure is applied to the label face causing the adhesives to blend together or alternatively, if the adhesives are flowable after application, they may blend with one another and not toward the uncoated edge 210, permitting the uncoated edge to remain free of adhesive. That is, the outer most edge of adhesive pattern of the two patterns catches or traps the inner most edge of adhesive pattern (the one with the greater thickness) from flowing into the perimeter area.

Figure 3:
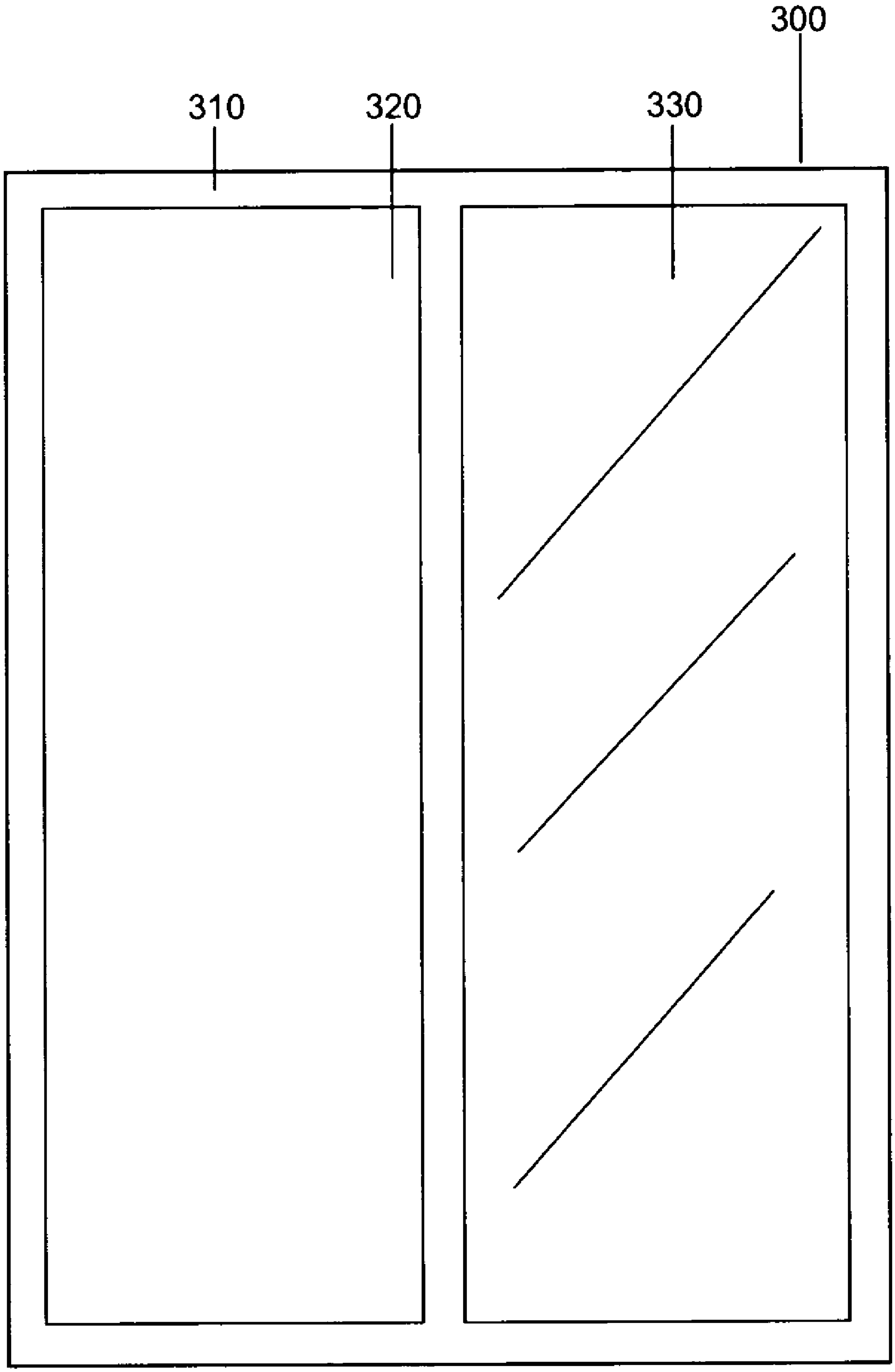
FIG. 3 illustrates a further embodiment of the present invention and shows the backside of a label with a different pattern or thickness of adhesive, in an adjacent or abutted edge configuration.

Turning now to FIG. 3, the substrate is depicted and generally referred to by reference numeral 300. The reference numeral 310 depicts an adhesive coating on the substrate 300. In an exemplary embodiment of the present invention, reference numeral 320 depicts a second pattern of adhesive having coat weight or thickness of approximately 1 mil of a pressure sensitive adhesive. Numeral 330 depicts a further pattern of adhesive having coat weight or thickness of approximately 1.0 to about 2.5-mil of a pressure sensitive adhesive. It should be understood in reference to this FIG. 3 the first pattern of adhesive can be coated or applied so that it is substantially adjacent the edge of the substrate. In addition, the adhesive types may both be permanent pressure sensitive, or one may be a permanent pressure sensitive while the other is a removable or even repositionable adhesive; any combination is possible. Adhesive types and suppliers are generally well known to those with skill in the industry, but exemplary adhesives may be obtained from such vendors as HB Fuller and National Starch Company.

FIG. 3 is depicted, so that it is understood by those skilled in the art, to illustrate that a variety of arrangements of the adhesive can be created to accomplish a wide spectrum of uses and applications by the end-user. As presented in FIG. 3, two generally parallel patterns of adhesive are provided on a single substrate coated with a further adhesive. The patterns may include a single thickness or type of adhesive or alternatively, may have plural adhesives juxtaposed on one another.

Figure 3A:
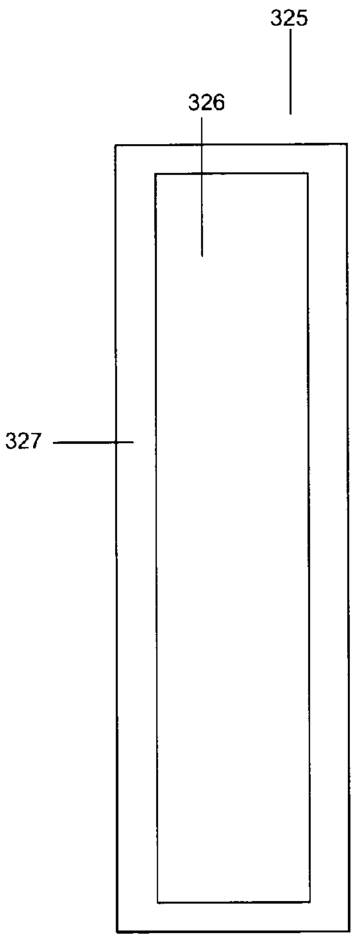
FIG. 3A depicts a top view of the multiple layered coatings or patterns of adhesives applied to the substrate in a stair stepped configuration.

FIG. 3A illustrates one coating, pattern, or layered embodiment of the present invention the label is generally depicted by reference numeral 325 and has a first coating of adhesives 27 that abuts or is adjacent to an edge of the label substrate. A second coating 326 is applied over the first coating. It should be understood the second coating 326 may cover the entire area of the first coating 327 or only a portion thereof.

Figure 3B:
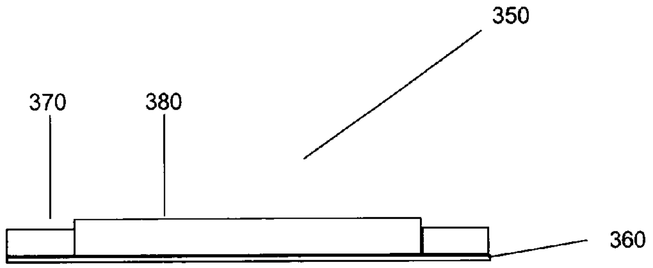
FIG. 3B depicts a side view of the multiple layered coatings or patterns of adhesives applied to the substrate in a stair stepped configuration.

Turning now to FIG. 3B, reference numeral 350 is used to depict generally a cut away or side view of the present invention. Substrate 360 may again be selected from any suitable stock material, cellulosic based, synthetic films, metalized films, etc., with the first layer of the adhesive 370 applied to the substrate such as through the use of a slot die or other means acceptable for placing the adhesive in a particular pattern, creating a non-oozing edge or edge less likely to ooze. The second layer of adhesive 380 may be applied using a similar apparatus or process. As shown, the second layer 380 has a height that is greater than the first layer 370 so as to create a stair stepped arrangement with one adhesive layer 380 rising above the adhesive layer 370. It should be understood that additional patterns may be disposed on the coated arrangement creating additional "stairs" or levels, or additional patterns such as a third, fourth, & fifth, etc. Pattern of adhesive may be layered on the first and/or second pattern of adhesive.

Figure 3C:
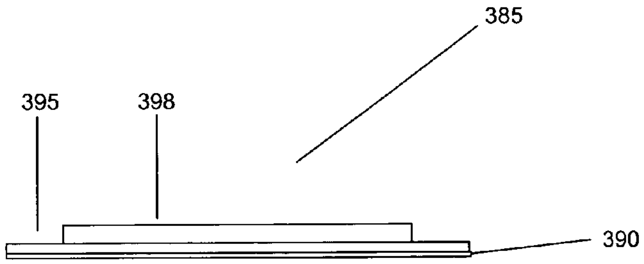
FIG. 3C shows a side view of a further version of the multiple layered coatings of adhesives where the second coating is disposed on top of the first coating.

FIG. 3C illustrates a further coating or pattern embodiment of the present invention and the label product is generally depicted by reference to numeral 385. In this embodiment, which represents a side view of the label product, the first layer of adhesive is applied to the substrate and then a second layer of adhesive 398 is applied over at least a portion of the top of the first portion. The adhesives may each be permanent pressure sensitive type adhesives or one may be a permanent pressure sensitive adhesive and the other a different type of adhesive such as a removable adhesive. In this exemplary arrangement of the present invention the first coating may range from about 1.0 to about 2.5 mil and a second coating is juxtaposed on the first coating and the second coating may have about a 1.0 mil thickness allowing the overall thickness of the label to be about 1.5 to about 3.5 mil, and preferably a thickness of about 3.0 mil or greater. The second adhesive coating may substantially cover the first coating or may be spaced inwardly from all edges of the first coating or from only one or more edges. That is, spaced inwardly from one or more longitudinal side edges or one or more of the transverse end edges or both.

Figure 4:
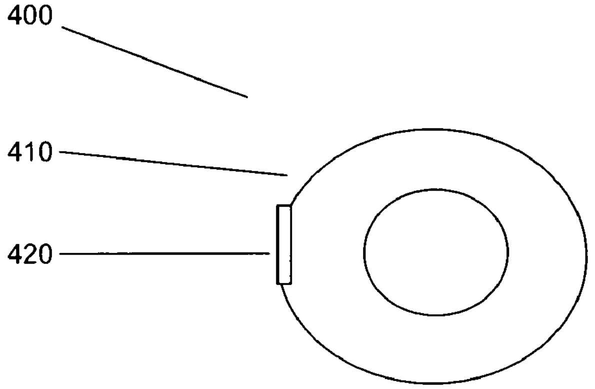
FIG. 4 illustrates the side view of an exemplary embodiment of the present invention, showing a tire with an exemplary label of the present invention attached or adhered to its surface.
Figure 4A:
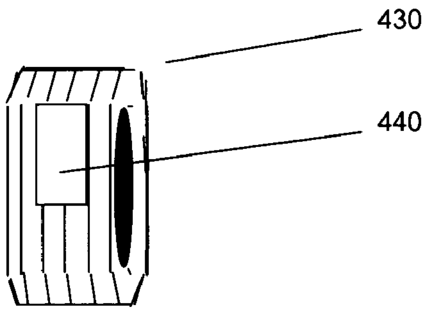
FIG. 4A is a front view of an exemplary use of the product as provided in FIG. 4.

Turning now to FIG. 4, numeral 400 depicts generally the tire label combination and is representative of affixing, the label of the present invention to a discontinuous surface. A tire has various grooves known as a tread pattern. Numeral 410 depicts the side view of the tire having the label attached which is numeral 420. FIG. 4A, represents the frontal view of a tire, 430, with the label attached or adhered and depicted as numeral 440. The thickness of the adhesive on the label "reaches" into the tread pattern or discontinuous surface enabling the label to grip to the article to which it is applied.

Figure 4B:
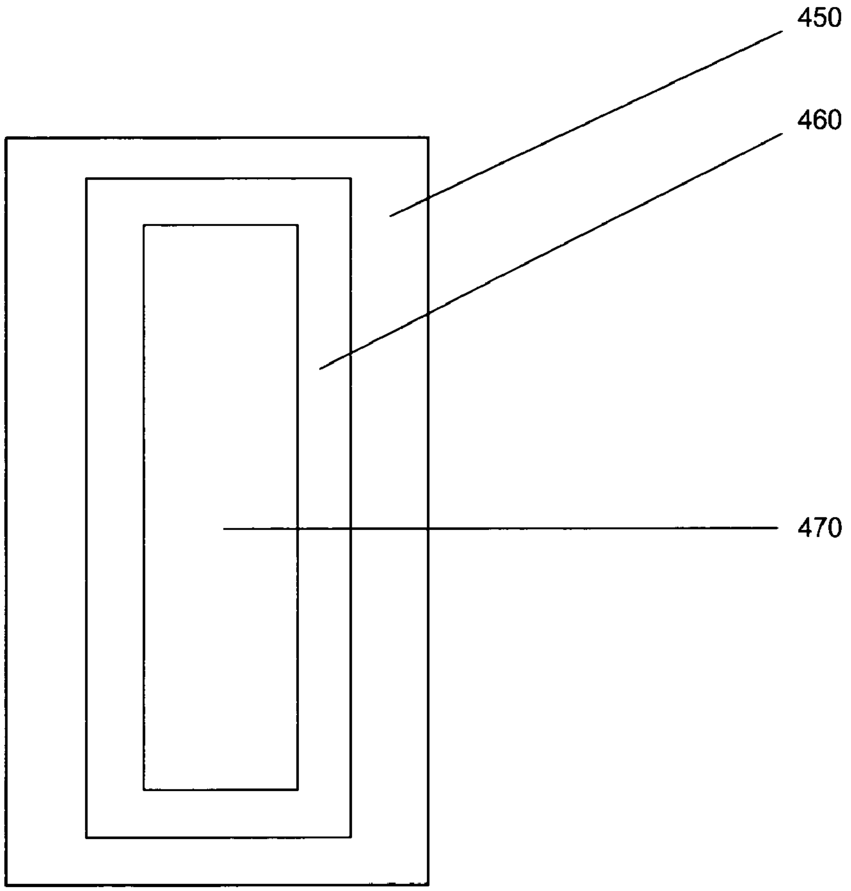
FIG. 4B is a further illustration of a label of the present invention.

FIG. 4B, depicts one particular construction, to help those skilled in the art understand the unique characteristics of the invention. As seen in FIG. 4B, numeral 450 represents about a 1 mil coating on the most outer edge of the label, while numeral 460 represents about a 2 mil coating, in the middle section and/or central area of the label. Keeping this depiction in mind, one can now envision that the multiple thickness of this particular construction would prevent premature lifting, due to the thick adhesive/coating in the center area 460. The present invention as described herein substantially eliminates the prior art problem of "lifting", due to the 1 mil coating on the most outer edge of the label and the heavy coating, in this case 2 mil, in the middle and/or central area of the label resulting in an adhesive thickness of about 3 mil in the middle or center of the label. Of course, many alternate methods or arrangements of the adhesive can be achieved. One exemplary illustration can be seen by returning to FIG. 4B, with the finished product having removable adhesive, numeral 450, and repositionable adhesive, numeral 460. A third pattern of adhesive 470 may also be added and be the same as or distinct from the other patterns.

Keep in mind that at the same time this present invention can be produced with an adhesive free edge. The first layer of adhesive and/or coating disposed inwardly of the side and end edges about 0.001 to about 5 inches and the second layer or adhesive and/or coating disposed in the center. With the perimeter being adhesive free edge the present invention eliminates adhesive "ooze" (resulting from pressure and/or heat) which is known to occur in prior art applications as the business form and/or label is processed through laser and ink jet printers and the like. Adhesive ooze results from pressure being applied to the label face so that the adhesive flows outwardly. The aforementioned construction would prevent adhesive "ooze" which causes continuous and disturbing jams in laser and ink jet printers for the end user. Also, keep in mind that the present invention can depict a wide variety of coat weights, zones, patterns, substrates, inks, media, arrangements of adhesives/coatings, differing peel strengths, along with and not limited to a variety of adhesives and coatings, contained all within one sheet and/or sheets.

Figure 5:
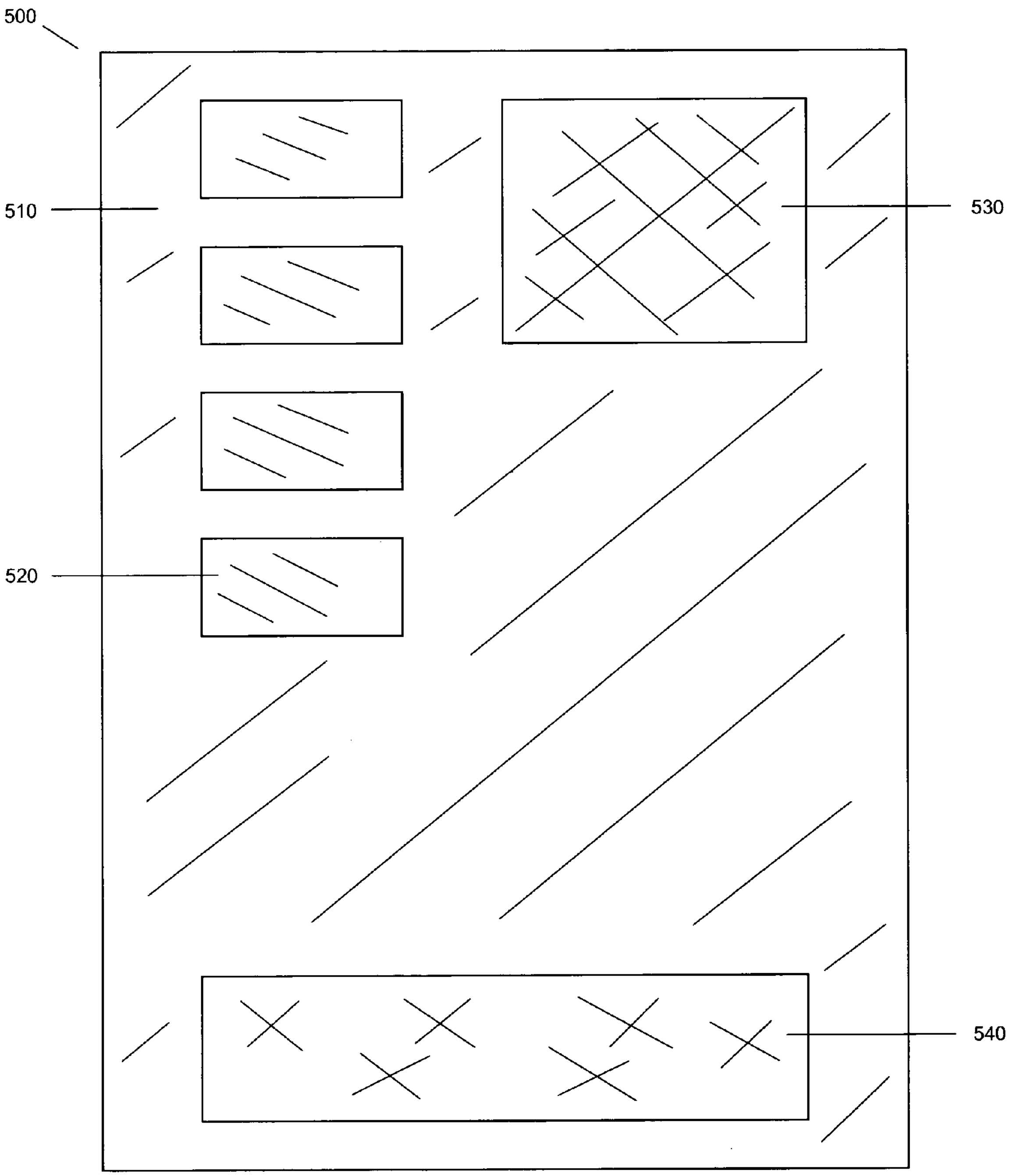
FIG. 5 shows a further embodiment of the present invention having a plurality of different adhesive coated zones.

Finally, turning to FIG. 5, a still further exemplary embodiment of the present invention is provided and depicted by reference to numeral 500. The label substrate is coated with a first adhesive 510 having a first thickness or property. The coating of this adhesive may extend throughout the label area or may be provided in particular zones or areas. Individual die cuts are used to create separable labels 520 which have the first property of the first adhesive. A second coating of adhesive 530 and 540 is provided, so as to create additional separable labels that have two adhesives juxtaposed on one another. That is, the adhesive in areas 530 and 540 is coated on top of the first adhesive 510. In this embodiment, different adhesive types can be used to solve different labeling needs or applications.

The inventors hereby state their intent to rely on the Doctrine of Equivalents to determine and assess the reasonably fair scope of their invention as it pertains to any apparatus, system, method or article not materially departing from but outside the literal scope of the invention, as set out in the following claims.

It will thus be seen according to the present invention that a highly advantageous multiple coated label and/or combination of a business form and label(s) having alternate methods of multiple layered and/or patterned coat weights of adhesive and/or coatings has been provided. While the invention has been described in connection with what is presently considered to be the most practical and preferred embodiment, it will be apparent to those of ordinary skill in the art that the invention is not to be limited to the disclosed embodiment and that many modifications and equivalent arrangements may be made thereof within the scope of the invention. The scope is to be accorded the broadest interpretation of the appended claims so as to encompass all equivalent structures and products.

The invention claimed is:

1. A business form label combination comprising;

a substrate having first and second faces, each of said first and second faces having a central portion and a perimeter portion;

one of said first and second faces having a first area for receiving indicia and another of said first and second faces having a second area capable of receiving an adhesive, said second area having a central portion and a perimeter portion;

a first pattern of adhesive applied to one of said first and second faces in said second area;

a second pattern of adhesive applied to said one of said first and second faces in said second area, said second pattern of adhesive disposed substantially adjacent said first pattern of adhesive such that first and second patterns of adhesives are provided in a stair step configuration; and said second area having an adhesive free area extending about said perimeter portion.

2. A business form label combination as recited in claim 1, wherein said adhesive free area is confined to said perimeter portion of said second face such that said first area remains substantially free of adhesive.

3. A business form label combination as recited in claim 1, wherein each of said first and second patterns has a different thickness.

4. A business form label combination as recited in claim 1, wherein said first and second patterns of adhesive is selected from a group including permanent adhesives, removable adhesives, repositionable adhesives and combinations thereof.

5. A business form label combination as recited in claim 1, wherein said first and second adhesive have at least first and second properties that are distinct from one another.

6. A business form and label combination as recited in claim 5, wherein the first and second properties are adhesive types.

7. A business form label combination as recited in claim 5, wherein said first and second properties are coat weights.

8. A business form label combination as recited in claim 5, wherein said first and second properties are different peel strengths.

9. A business form label combination as recited in claim 1, wherein said label is suitable for use in contaminated, discontinuous surfaces and combinations thereof.

10. A label as recited in claim 9, wherein said contaminated environments, discontinuous surfaces are selected from a group including, structural or composite corners, wood, burlap, furniture, steel, corrugated materials, manhole covers, cast iron, pig iron, foundry work, concrete, automobile and vehicle tires, logs, inner tubes, rubber pipes and hoses, automotive, vehicle components and combinations thereof.

11. A business form label combination comprising;

a substrate having first and second faces, each of said first and second faces having a central portion and a perimeter portion;

one of said first and second faces having a first area for receiving indicia and another of said first and second faces having a second area capable of receiving an adhesive, said second area having a central portion and a perimeter portion;

a first pattern of adhesive applied to one of said first and second faces in said second area;

a second pattern of adhesive applied to said one of said first and second faces in said second area, said second pattern of adhesive juxtaposed over said first pattern of adhesive; and wherein said first and second adhesive have distinct coat weights.

12. A business form label combination comprising;

a substrate having first and second faces, each of said first and second faces having a central portion and a perimeter portion;

one of said first and second faces having a first area for receiving indicia and another of said first and second faces having a second area capable of receiving an adhesive, said second area having a central portion and a perimeter portion;

a first pattern of adhesive applied to one of said first and second faces in said second area;

a second pattern of adhesive applied to said one of said first and second faces in said second area, said second pattern of adhesive juxtaposed over said first pattern of adhesive; and wherein said first and second patterns of adhesives are provided in a stair step configuration.

* * * * *